Aug. 28, 1956     F. C. BORIS ET AL     2,760,822

LIQUID SPRAYER

Filed March 2, 1954

United States Patent Office 2,760,822
Patented Aug. 28, 1956

2,760,822

LIQUID SPRAYER

François Charles Boris and Sonia Boris née Jokelson, Paris, France, assignors to Holbrefin S. A., Geneva, Switzerland Application March 2, 1954, Serial No. 413,678

Claims priority, application France January 8, 1954

4 Claims. (Cl. 299—88)

This patent relates to new improvements in liquid sprayers. It is well known to-day to constitute a sprayer which comprises an assembly of a piston and a cylinder, one piece of which serves as a stopper for a container containing the product to be sprayed, the other one being connected through a rod to a valve adapted to obturate a passage of the first piece which allows the cylinder and the container to communicate, a resilient member urging the valve towards the obturating position and an absorbing substance to absorb the liquid passing through the passage when the sprayer is turned upside down and the valve open.

When the sprayer is turned upside down and the piston driven into the cylinder, air will pass from the cylinder into the container; when the piston is thereafter released, a corresponding volume of liquid will pass into the cylinder and imbibe the absorbing material and be ejected during the next stroke of the piston.

It sometimes happens that, in such sprayers, the amount of air passing into the container and, consequently that of the liquid passing into the cylinder, are too great and the liquid drips at the outlet of the sprayer.

This invention has for its object an improvement in such sprayers which makes it possible to obviate the above drawback.

According to the invention, a plate of a resilient material is provided in the cylinder near its bottom, said plate being formed with a hole through which the rod of the valve extends, the sizes of the rod and of the hole through which the latter extends being such that the rod may slide with a soft friction and means are provided to prevent the plate from moving away from the bottom beyond a given distance.

The rod of the valve may be formed with a smaller cross-sectioned portion which engages the passage through which the cylinder and the container communicate when the piston is driven in; its diameter depends on the delivery desired. Perforations may be formed in the periphery of the plate to improve the adjustment.

Under such conditions, when the piston is driven in, whereby the valve is brought into its open position, air will pass into the container as long as the smaller cross-sectioned portion of the rod of the valve is in the passage. When the portion of the rod having the greater diameter comes in the hole of the plate, it will stop said hole and drive the plate to the opening of the passage which closes it, preventing the compressed air in the cylinder from passing on into the container. This obturation serves to increase the proportion of air serving for the spraying and the delivery of the sprayer, other things being equal. When a constant cross-sectioned valve rod is used, the air will pass into the container until the plate closes the opening of the passage. In this case, the air and the product to be sprayed circulate in the annular enclosure between the rod of the valve and the walls of the passage in one direction and in the opposite one, respectively. When the piston is released, the rod will resume its initial position and drive the plate until it meets its stopping member; during this displacement, a certain amount of liquid which depends on the volume of air that has entered the container, will flow in the cylinder when the smaller cross-sectioned portion of the valve is in the passage.

Hereinafter, there has been described, by way of non-limitative example, various sprayers improved according to the invention with reference to the attached drawings.

Figure 1:
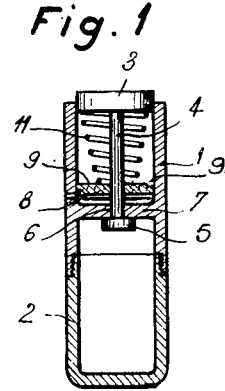
Fig. 1 is an axial cross-sectional view of a first embodiment of a sprayer according to the invention.
Figure 2:
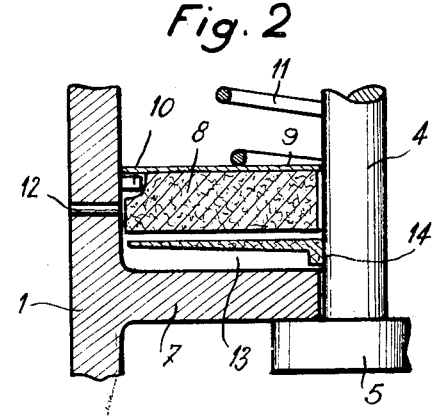
Fig. 2 is a detail cross-sectional view.

The sprayer illustrated on Figs. 1 and 2 comprises a cylinder 1 on which the container 2 for holding the liquid to be sprayed is adapted to be screwed. In the cylinder 1 a piston 3 is mounted slidingly and is connected through a rod 4 to a valve 5 capable of closing a passage 6 formed in a partition 7.

Over the partition 7, a washer 8 formed, for example, of felt or any other suitable absorbent material, is provided and is surmounted by a plate 9 resting on abutments 10 and having an aperture 9a. A spring 11 is interposed between the plate 9 and the piston 3 and tends to apply the valve 5 on the orifice of the passage 6. The spring 11 cannot crush the felt washer 8 since the plate 9 is supported by the abutments 10. In the wall of the cylinder 1 is a spraying orifice 12 just opposite to the absorbing washer 8.

According to the invention, an interval 13 is provided between the washer 8 and the partition 7. In this interval is a plate 14 having a central hole through which the rod 4 extends and the sizes of the rod 4 and hole in plate 14 are such that the rod may slide in the central hole of plate 14 with a soft friction.

When the assembly is inverted so that the piston sprayer is placed under the container 2 and the piston 3 driven into the cylinder 1, the valve 5 will open and a certain amount of air, which is a function of the difference of the pressures in the cylinder 1 and the container 2, will pass from the cylinder into the container 2 through the passage 6. This movement of air will be stopped when the plate 14 driven by the rod 4 is applied against the wall 7 which obturates the orifice of the annular passage provided between the wall of the passage 6 and the rod 4. By releasing thereafter the piston 3, a certain amount of liquid equal to the volume of air that passed from the cylinder into the container passes into the cylinder through the passage 6 and imbibes the absorbing material 8. At the same time, the plate 14 is brought back into its initial position and abuts against the washer 8. During the next stroke of the piston, the compressed air in the cylinder 1 passes through the washer 8 and escapes through the spraying orifice 12 drawing the liquid with which the absorbing material 8 has been imbibed.

Figure 3:
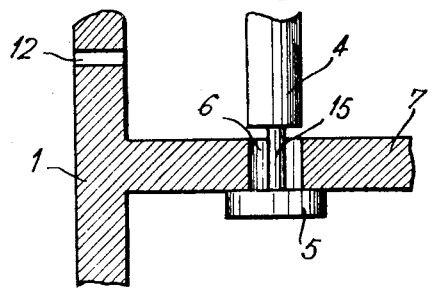
Fig. 3 is a detail cross-sectional view of another embodiment.

In the embodiment of Fig. 3, the rod 4 comprises near the valve 5 a smaller cross-sectioned portion 15; the air can then pass from the cylinder 1 into the container 2, even when the plate 14 is applied on the partition 7 when the smaller cross-sectioned portion 15 is in the passage 6.

Figure 4:
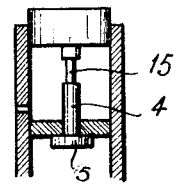
Figs. 4 and 5 are axial cross-sectional views of further embodiments.

As the amount of liquid that passes from the container into the cylinder is a function of the amount of air admitted during the preceding step in the container, it will be advantageous, when the liquid is rather viscous, to provide the smaller sectioned portion 15 of the rod 4 at a certain interval from the valve 5, as shown on Fig. 4, in which there has been illustrated the piston and the cylinder of the sprayer only. In this case, when the container 2 and the cylinder 1 are allowed to communicate, the overpressure in the cylinder 1 will be higher and the amount of air introduced in the container also greater.

Figure 5:
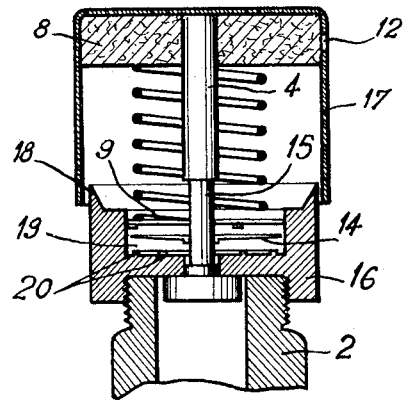

In the embodiment of Fig. 5, the sprayer comprises a piston 16 screwed on the neck of a container 2. On this piston is mounted slidingly a cylinder 17 at the bottom of which is the absorbing material 8 and which carries the rod of the valve 4. The piston 16 comprises on its upper face and on its periphery, a rim 18 which ensures tightness and is provided with an enclosure 19 on the upper face of which is a metal plate 9. A plate 14 is provided between the plate 9 and the upper face of the piston 16, the plate 14 being formed with a hole which receives the smaller sectioned portion 15 of the rod 4 and engages the latter with a soft or light friction. The bottom of the enclosure 19 is preferably provided with ribs 20 to prevent the plate 14 from adhering to said bottom. This sprayer operates in the same way as the sprayer that has been described.

Figure 6:
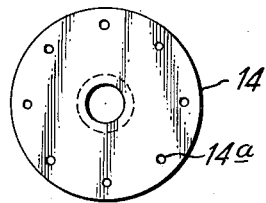
Fig. 6 is a detail plan view of a modified resilient plate for use in any of the embodiments of Figs. 1, 3, 4 and 5, respectively.

Referring now to Fig. 6, it will be seen that the resilient plate 14 may have openings or perforations 14a in its peripheral portion to equalize the pressures at the opposite sides thereof so that the plate 14 will be freely movable against and away from the passage communicating with the container 2 in response to the frictional adherence of the plate 14 to the connecting member 4.

Of course, the invention is not restricted to the embodiments described and illustrated and any modification may be made in it without departing from the spirit thereof.

What we claim is:

1. A sprayer comprising two slidably telescoping parts forming a piston and cylinder, respectively, one of said parts constituting a stopper for a container holding the liquid to be sprayed and having a passage for communication with the container, a connecting member extending from the other of said parts and carrying a valve for closing said passage, resilient means acting on said other part to urge the latter in the direction causing said valve to close said passage, an absorbent body disposed in the cylinder forming part to receive the liquid which passes from the container through said passage when the sprayer is inverted and said valve is opened, said cylinder forming part having a spray outlet therein adjacent said absorbent body, a resilient plate independent of said valve disposed within said one part adjacent said passage and having an aperture through which said connecting member slidably extends, said aperture and connecting member being dimensioned at their engaging portions so that said connecting member can slide within said resilient plate but with a soft frictional engagement therebetween, and means limiting the movement of said resilient plate with said connecting member in the direction away from said passage so that, after a predetermined movement of said connecting member in the direction for opening of said valve, said resilient plate effects closing of said passage to prevent excessive flow of liquid into said absorbent body.

2. A sprayer according to claim 1; wherein said connecting member has a portion of reduced cross-section which, when positioned within said passage, permits the flow of liquid through the latter.

3. A sprayer according to claim 1; wherein said resilient plate has openings in its peripheral portion to equalize the pressures at the opposite sides thereof so that said resilient plate is freely movable against and away from said passage in response to the frictional adherence of the plate to said connecting member.

4. A sprayer according to claim 1; wherein said one part has a partition therein through which said passage extends, and said valve and resilient plate are disposed at opposite sides of said partition.

References Cited in the file of this patent

UNITED STATES PATENTS 2,651,544    Cuadras _____ Sept. 8, 1953